US012623101B2

(12) United States Patent
Fabbi

(10) Patent No.: US 12,623,101 B2
(45) Date of Patent: May 12, 2026

(54) ANCHOR DEVICES FOR FALL PROTECTION

(71) Applicant: Unified Safety Inc., Kelowna (CA)

(72) Inventor: Christopher Fabbi, Kelowna (CA)

(73) Assignee: Unified Safety Inc., Kelowna (CA)

( * ) Notice: Subject to any disclaimer, the term of this patent is extended or adjusted under 35 U.S.C. 154(b) by 0 days.

(21) Appl. No.: 18/634,760

(22) Filed: Apr. 12, 2024

(65) Prior Publication Data

US 2024/0342522 A1 Oct. 17, 2024

Related U.S. Application Data

(60) Provisional application No. 63/496,188, filed on Apr. 14, 2023.

(51) Int. Cl.
*A62B 35/00* (2006.01)

(52) U.S. Cl.
CPC ................................ *A62B 35/0068* (2013.01)

(58) Field of Classification Search
CPC .................................................. A62B 35/0068
See application file for complete search history.

(56) References Cited

U.S. PATENT DOCUMENTS 4,249,713 A 2/1981 Glynn
4,261,155 A * 4/1981 Gilb ...................... E04B 1/2612 248/282.1
5,143,170 A 9/1992 Hunt
5,174,539 A * 12/1992 Leonard ................. F16M 13/02 248/300
5,287,944 A 2/1994 Woodyard
5,598,680 A * 2/1997 Wilhelmi .............. E04B 1/2608 403/231
5,730,407 A * 3/1998 Ostrobrod .......... A62B 35/0043 248/237
5,975,239 A * 11/1999 Castaneda ........... E04G 21/3261 248/237
6,286,273 B1 9/2001 Villela
6,668,509 B1 12/2003 Krebs
6,722,469 B1 * 4/2004 Weger, Jr. ................. E06C 7/48 248/210
6,786,020 B2 9/2004 Poldmaa
(Continued)

FOREIGN PATENT DOCUMENTS

AU 2011100284 A4 * 4/2011 ......... E04G 21/3261
DE 102008010445 8/2008
(Continued)

*Primary Examiner* — Monica E Millner
(74) *Attorney, Agent, or Firm* — Critical Path IP Law, LLC

(57) ABSTRACT

Anchor devices for fall protection are provided. The anchor device may comprise a structural sheet and at least one anchorage connector. The sheet may be a one-sided sheet or a two-sided sheet and may comprise a plurality of slots with an elongated or round profile for connecting the sheet to a working structure such as a roof. In some embodiments, the slots are at an angle. The anchorage connector may be one of the following structures: 1) a loop with a hole extending therethrough, the loop being integral with the sheet; 2) a lateral extension having a tubular portion that engages a connector ring; and/or 3) a bent extension connected to a connector ring via a bolt. In some embodiments, the anchor device may further comprise one or more testing projections.

18 Claims, 12 Drawing Sheets

(56) References Cited

U.S. PATENT DOCUMENTS

| | | | | |
|---|---|---|---|---|
| 7,665,248 | B2 | 2/2010 | Blatchford | |
| 7,832,153 | B2 * | 11/2010 | Crookston | E04C 3/17 52/712 |
| 7,854,421 | B2 * | 12/2010 | Florent | F16L 3/243 248/300 |
| 8,997,408 | B2 | 4/2015 | Vidal | |
| 9,194,129 | B2 * | 11/2015 | O'Donnell | E04G 21/328 |
| 9,316,008 | B2 * | 4/2016 | Poldmaa | E04G 21/3276 |
| 9,327,147 | B2 * | 5/2016 | Snider | E04G 5/041 |
| 9,643,035 | B2 * | 5/2017 | Mastenbroek | E04G 21/3276 |
| 9,744,387 | B1 | 8/2017 | Hung | |
| 10,617,898 | B2 * | 4/2020 | Poldmaa | F16F 7/128 |
| 11,013,941 | B2 * | 5/2021 | Teiner | E04G 21/3261 |
| 11,470,837 | B2 * | 10/2022 | Schallenkamp | A01M 23/245 |
| 11,554,277 | B2 | 1/2023 | Fabbi | |
| 11,698,166 | B1 * | 7/2023 | Ryan | C21D 8/005 248/205.1 |
| 11,939,781 | B2 | 3/2024 | Fabbi | |
| 12,404,687 | B2 * | 9/2025 | Voss | E04G 21/3261 |
| 2006/0059844 | A1 * | 3/2006 | Ely | E04G 21/3276 52/698 |
| 2008/0222972 | A1 | 9/2008 | Crookston | |
| 2012/0067667 | A1 * | 3/2012 | Marcoux | E04G 21/3276 248/237 |
| 2013/0206940 | A1 * | 8/2013 | Hopkins | E04G 21/3295 248/237 |
| 2015/0075107 | A1 * | 3/2015 | Wert | E04B 7/022 52/643 |
| 2017/0268243 | A1 * | 9/2017 | Lopez | E04G 21/3223 |
| 2017/0342718 | A1 | 11/2017 | Erekson | |
| 2020/0188710 | A1 * | 6/2020 | Roseveare, Jr. | E04G 21/3276 |
| 2021/0214960 | A1 * | 7/2021 | Price | H01Q 1/1235 |
| 2023/0349181 | A1 * | 11/2023 | Voss | E04G 21/328 |
| 2024/0102302 | A1 * | 3/2024 | Voss | A62B 35/04 |
| 2025/0052080 | A1 * | 2/2025 | Meinhold | E04G 21/3295 |

FOREIGN PATENT DOCUMENTS

| | | | | |
|---|---|---|---|---|
| EP | 0 593 150 | | 4/1996 | |
| ES | 2765975 | A1 * | 6/2020 | E04D 13/12 |
| FR | 2766223 | | 1/1999 | |
| GB | 2328664 | | 3/1999 | |
| WO | WO2002/044496 | | 6/2002 | |
| WO | WO-2006123979 | A1 * | 11/2006 | E04G 21/329 |
| WO | WO2006/021794 | | 3/2008 | |
| WO | WO2013/159888 | | 10/2013 | |
| WO | WO-2024059897 | A1 * | 3/2024 | E04G 21/239 |

* cited by examiner

ANCHOR DEVICES FOR FALL PROTECTION

CROSS-REFERENCE TO RELATED APPLICATION

The present disclosure claims priority to U.S. Provisional Patent Application No. 63/496,188, filed Apr. 14, 2023, the entire content of which is herein incorporated by reference.

FIELD

The present disclosure relates to anchor devices. More particularly, the present disclosure relates to anchor devices for fall protection for installation on elevated structures such as roofs of buildings.

BACKGROUND

Operative access to elevated structures, such as roof areas, is a major source of danger during building construction, inspection and maintenance procedures, especially on sloping roofs. Falls from elevated structures are a common contributor to injuries and fatalities in the construction industry. A variety of fall protection devices and systems have been developed to anchor a user to the elevated structure, for example, via a safety line. Such devices typically attach to the roof (or other working structure) via a small number of fastening apertures and typically to a single structural member.

Moreover, conventional devices are often comprised of multiple components that are assembled into the final device, resulting in increased manufacturing costs as well as potential weak points. Current commercial devices are also not typically configured to allow ventilation i.e., to allow air from inside the structure to exit therethrough. The lack of ventilation may decrease the efficiency of air exchange, particularly in attic spaces with a vented ridge cap.

SUMMARY

In one aspect, there is provided an anchor device comprising: a structural sheet comprising an upper face and a lower face and having a longitudinal axis; at least one anchorage connector extending outwards from the sheet; and a plurality of slots extending through the sheet from the upper face to the lower face, each slot of the plurality of slots dimensioned to receive a respective fastener therethrough and having an elongated profile that is angled with respect to the longitudinal axis of the structural sheet.

In some embodiments, the plurality of slots are arranged in two or more rows, and wherein the slots of one row are at a different angle with respect to the longitudinal axis than the slots of another row.

In some embodiments, the slots of one row are longitudinally offset from the slots of another row.

In some embodiments, the two or more rows are arranged into a first pair of rows and a second pair of rows, and wherein the slots of the first pair of rows are at first angle and the slots of the second pair of rows are at a second angle, the second angle being different than the first angle.

In some embodiments, the two or more rows are further arranged into a third pair of rows, and wherein the slots of the third pair of rows are at the first angle.

In some embodiments, the anchor device further comprises at least one vent hole extending through the sheet from the upper face to the lower face, the at least one vent hole intersecting the longitudinal axis.

In some embodiments, at least one vent hole comprises a central vent hole and a plurality of side vent holes on either side of the central vent hole.

In some embodiments, at least one anchorage connector is integral with the sheet and comprises a loop with a hole extending therethrough.

In some embodiments, the loop is bent upwards towards the upper face of the sheet.

In some embodiments, at least one anchorage connector comprises: a connector ring; and a lateral extension of the sheet, the lateral extension having a tubular portion that receives a portion of the connector ring therethrough.

In some embodiments, at least one anchorage connector comprises: a connector ring; a bent extension of the sheet, the bent extension being bent upwards towards the upper face of the sheet; and a bolt extending through the bent extension to interconnect the bent extension and the connector ring.

In some embodiments, the sheet is a one-sided sheet such that at least one anchorage connector is a single anchorage connector extending outwards from one side of the sheet.

In some embodiments, the sheet is a two-sided sheet such that at least one anchorage connector comprises a first anchorage connector extending outwards from one side of the sheet and a second anchorage connector extending outwards from the opposite side of the sheet.

In some embodiments, the anchor device further comprises at least one testing projection extending outwards from the sheet, the at least one testing projection configured to detach from the sheet at a pre-determined load.

In some embodiments, at least one testing projection has a straight portion and a ring portion, the straight portion connected to the sheet via one or more detachable connection points and the ring portion extending from the straight portion and comprising a hole therethrough.

In some embodiments, at least one testing projection is V-shaped or U-shaped and has at least two detachable connection points with the sheet.

In another aspect, there is provided an anchor device comprising: a structural sheet comprising an upper face and a lower face and having a longitudinal axis; at least one anchorage connector extending outwards from the sheet; a plurality of slots extending through the sheet from the upper face to the lower face, each slot of the plurality of slots having an elongated or round profile; and at least one vent hole extending through the sheet from the upper face to the lower face, the at least one vent hole intersecting the longitudinal axis.

In some embodiments, at least one vent hole comprises a central vent hole and a plurality of side vent holes on either side of the central vent hole.

In another aspect, there is provided a method for making an anchor device, comprising: providing a structural sheet having a longitudinal axis; forming at least a portion of an anchorage connector in the structural sheet; forming a plurality of slots in the structural sheet, each slot of the plurality of slots dimensioned to receive a respective fastener therethrough and having an elongated profile that is angled with respect to the longitudinal axis of the structural sheet.

In some embodiments, the plurality of slots are arranged in two or more rows, and wherein the slots of one row are at a different angle with respect to the longitudinal axis than the slots of another row.

Other aspects and features of the present disclosure will become apparent, to those ordinarily skilled in the art, upon review of the following description of specific embodiments of the disclosure.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

Some aspects of the disclosure will now be described in greater detail with reference to the accompanying drawings. In the drawings.

DETAILED DESCRIPTION

Generally, the present disclosure provides an anchor device for fall protection. The anchor device may comprise a structural sheet and at least one anchorage connector. In some embodiments, the anchorage connector may be integral with the structural sheet. The anchor device may further comprise a plurality of slots extending through the sheet from the upper face to the lower face, wherein each of the plurality of slots has either a round or an elongated profile that may be angled relative to the longitudinal axis. Optionally, the anchor device may in some embodiments comprise of at least one vent hole extending through the sheet. In some embodiments, the anchor device may further comprise one or more testing projections.

As used herein, the terms “a”, “an”, and “the” may include plural referents unless the context clearly dictates otherwise.

As used herein, the terms “top” and “bottom”, “upper” and “lower”, “upward” and “downward” and the like refer to the typical orientation of the anchor device when installed on a working structure; however, a person skilled in the art will recognize that these are relative terms that are used for ease of description only and do not limit the orientation of the devices described herein.

As used herein, “working structure” refers to any structure on which the anchor device is installed. The working structure may be a portion of a building or any other suitable structure. In some embodiments, the working structure is a roof, including but not limited to a sloped roof or a flat roof. In some embodiments, the anchor device is to be installed on the peak or mid-slope of a sloped roof. In other embodiments, the working structure may be any other suitable structure and embodiments are not limited to only applications on roofs.

An example anchor device 100 will be discussed with reference to FIGS. 1 to 6.

Figure 1:
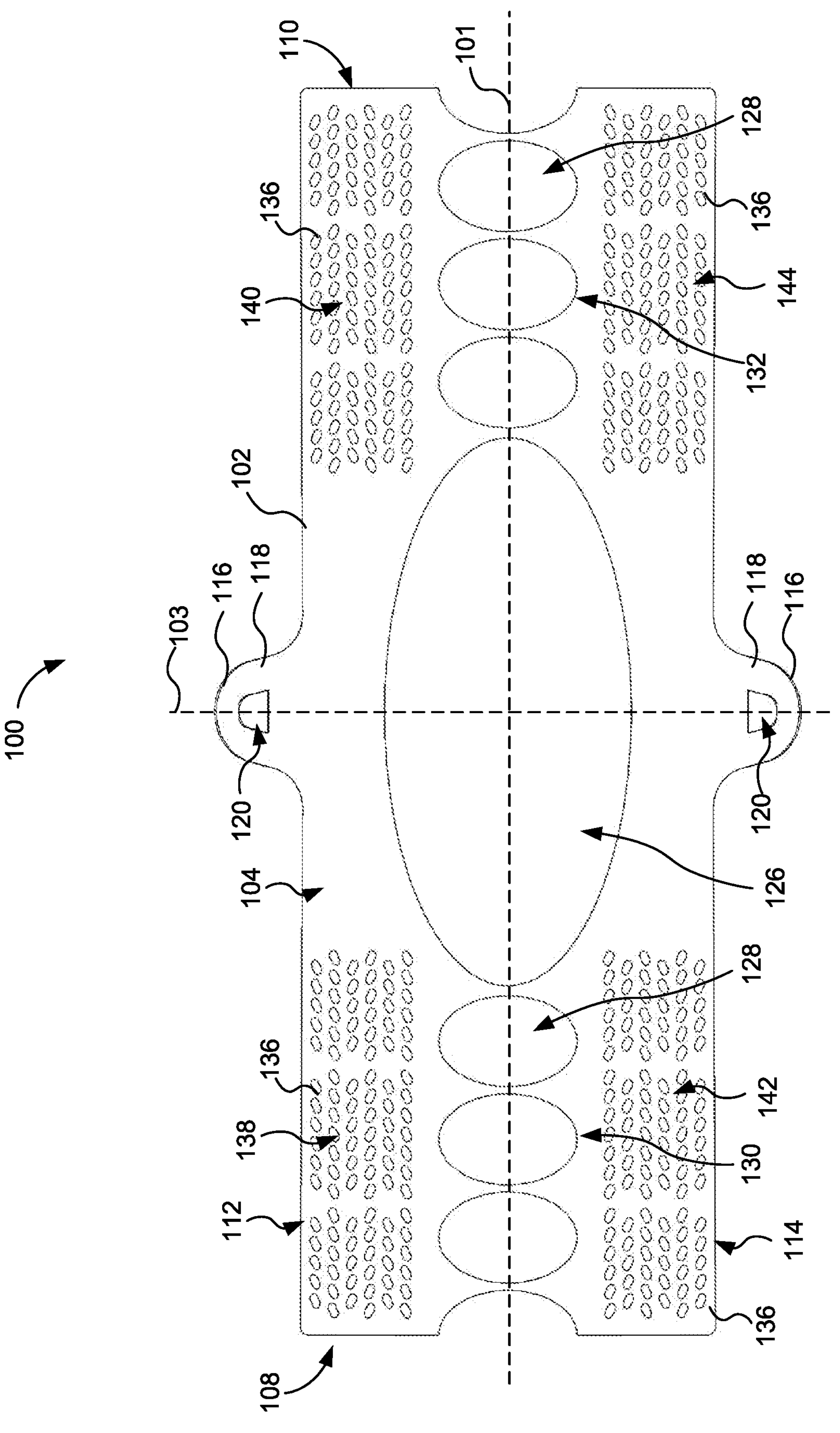
FIG. 1 is a top view of an example anchor device, according to some embodiments.
Figure 3:
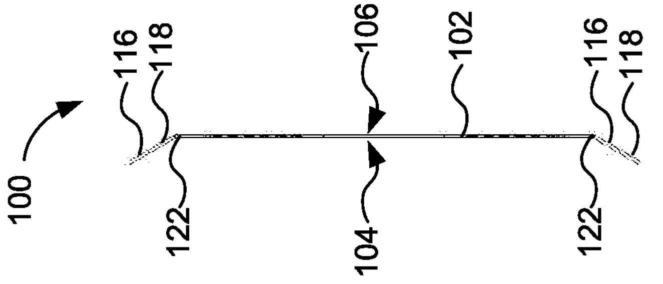
FIG. 3 is a side view of the anchor device of FIG. 1.

Referring to FIG. 1, the device 100 comprises a structural sheet 102 having an upper face 104 and a lower face 106 (the lower face 106 is visible in FIG. 3). In this embodiment, the sheet 102 is approximately rectangular in shape with first and second short sides 108 and 110 and first and second long sides 112 and 114. In other embodiments, the sheet 102 may be any other suitable shape.

The sheet 102 has a longitudinal axis 101 and a lateral axis 103. As used herein, the terms “longitudinally” and “laterally” may be used to refer to the direction of the longitudinal axis 101 and lateral axis 103, respectively, or equivalent axes in other embodiments.

The sheet 102 in this embodiment is bendable along the longitudinal axis 101 to allow the sheet 102 to conform to the peak of a roof or other working structure. The sheet 102 is a relatively thin and flat piece of a suitable material. In some embodiments, the sheet 102 is made of metal such as, for example, steel, stainless steel, or aluminum. In other embodiments, the sheet 102 is made of any other suitable material. The sheet 102 may have a suitable thickness to allow the sheet 102 to be bent along the longitudinal axis 101. In some embodiments, the sheet 102 has a thickness of between about 0.05 and 0.2 inches (or between about 1 mm and 5 mm). As one example, the sheet 102 may be approximately 0.1 inches (~0.25 cm) thick. In other embodiments, the sheet 102 may be any other suitable thickness.

The device 100 further comprises at least one anchorage connector 116 configured to allow a user to connect to the device 100, for example, via a safety line (not shown). In this embodiment, the device 100 comprises two anchorage connectors 116, one on the first long side 112 of the sheet 102 and one on the second long side 114. Each anchorage connector 116 extends outwards from the sheet 102. In this embodiment, each anchorage connector 116 extends laterally outwards i.e., approximately parallel to the lateral axis 103 and perpendicular to the longitudinal axis 101. Each anchorage connector 116 comprises a loop 118 with a hole 120 extending therethrough. The hole 120 is suitably sized to receive a hook, clip, clasp, etc. of a safety line or any other suitable apparatus to connect the user to the device 100.

Figure 2:
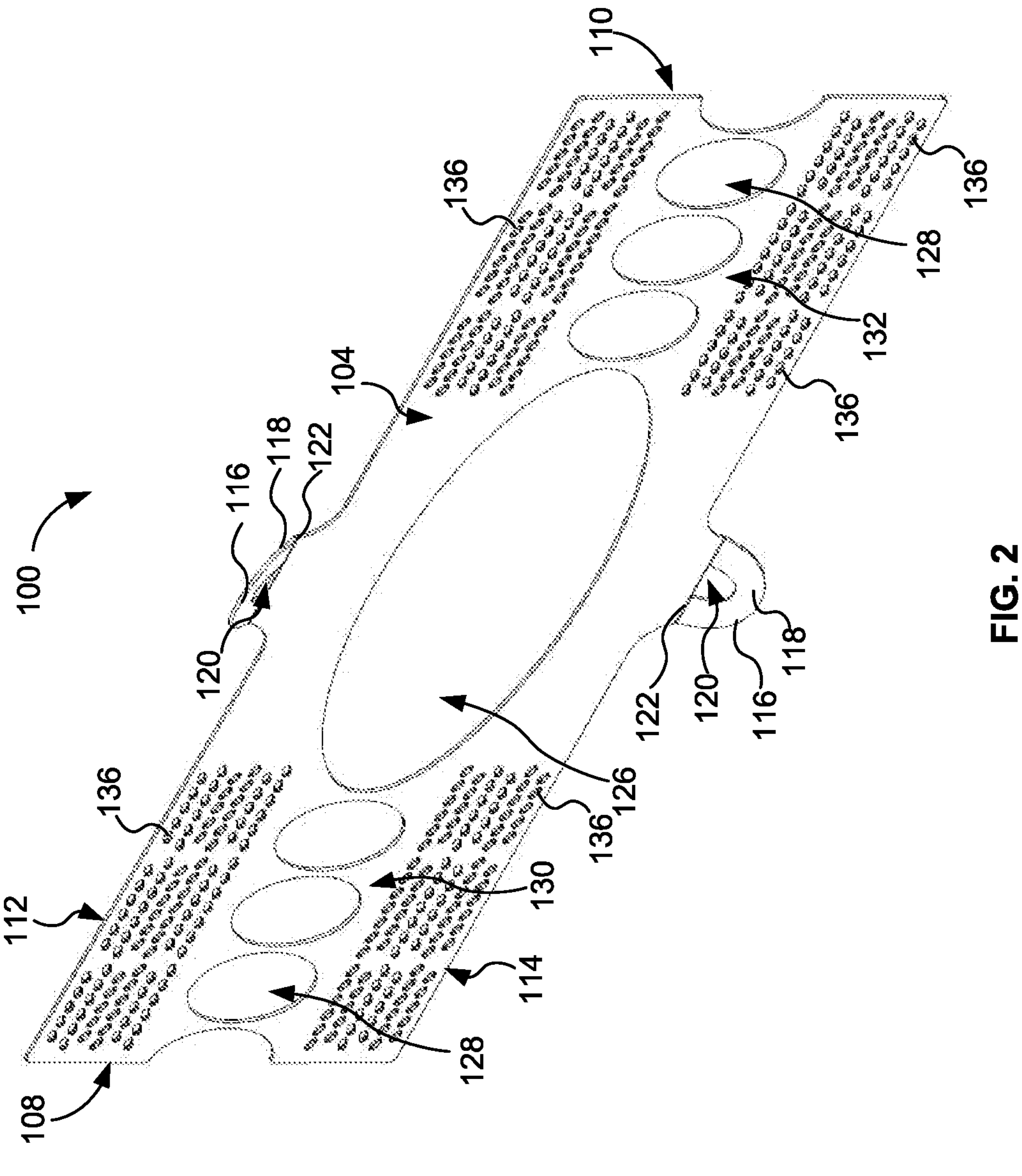
FIG. 2 is a perspective view of the anchor device of FIG. 1.

As shown in FIGS. 2 and 3, each loop 118 of the anchorage connector may be bent upwards along a bend line 122. In some embodiments, each loop 118 is bent upwards between 1° and 90° with respect to the sheet 102 proximate the loop 118 (i.e. towards the upper face 104). More particularly, each loop may be bent upwards by about 20° or about 40°, or approximately 30°. In other embodiments, each loop 118 is bent at any other suitable angle. By bending the loop 118 upwards, the loop 118 (and hole 120) is not flush against the working structure and is therefore easier to access by the user to connect their safety line thereto.

In this embodiment, the anchorage connectors 116 are integral with the sheet 102, such that the entire device 100 is formed out of a single piece of material. In other embodiments, the anchorage connectors 116 may be separate components that are coupled to the sheet 102 by a suitable coupling means.

Figure 4:
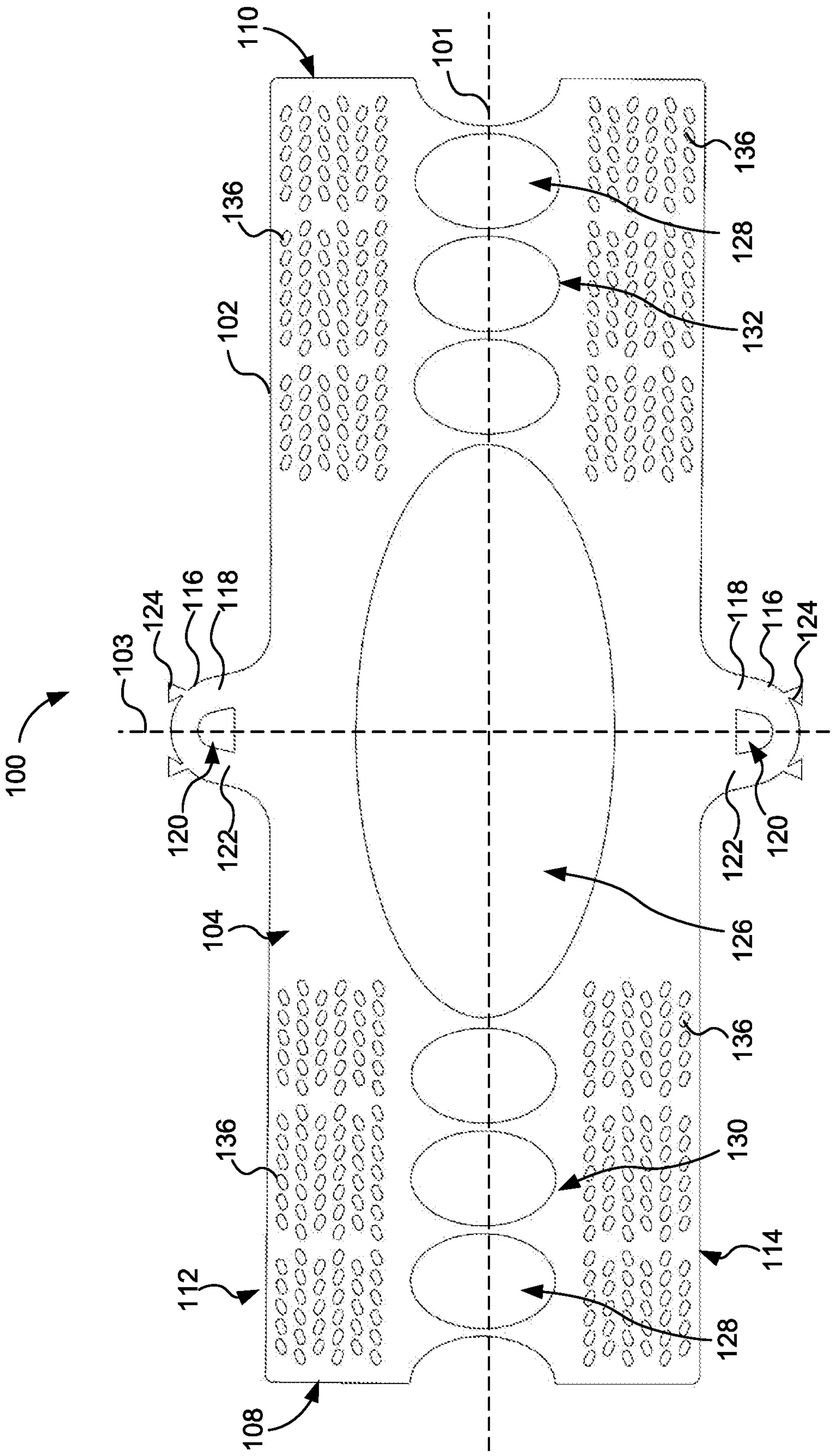
FIG. 4 is a top view of the anchor device of FIG. 1, shown with tabs on the anchorage connectors.

Referring to FIG. 4, in some embodiments, the sheet 102 is initially formed with one or more tabs 124 extending from each loop 118 of the anchorage connector 116. The tabs 124 may be used by the user (or manufacturer) to facilitate bending of the loop 118 along the bend line 122. After each loop 118 has been bent, the tabs 124 can be removed, for example, by cutting or breaking the tabs 124 off. In other embodiments, the tabs 124 may be in another location or omitted and the loops 118 may be bent by any other suitable means.

In this embodiment, the anchorage connectors 116 are at the approximate longitudinal center of the sheet 102 i.e., approximately along the lateral axis 103 and approximately midway between the first short side 108 and the second short side 110. In other embodiments, the anchorage connectors 116 may be at any other suitable position. In this embodiment, the sheet 102 is symmetrical about the longitudinal axis 101 and the two anchorage connectors 116 are longitudinally aligned with one another. In other embodiments, the sheet 102 may be asymmetrical and the anchorage connectors 116 may be longitudinally offset. In yet other embodiments, one of the anchorage connectors 116 may be omitted and only one anchorage connector 116 may be provided on the first long side 112 or the second long side 114.

Referring again to FIG. 1, the device 100 further comprises at least one vent hole extending through the sheet 102 between the upper face 104 and the lower face 106. The vent holes may also be referred to as "cut outs". The terms "vent hole" and "cut-out" in this context are used interchangeably to refer to any empty space or void within the sheet 102 and are inclusive of holes/cut-outs produced by removing material from the sheet 102 as well as holes/cut-outs produced by forming the sheet 102 with an empty space or void already therein (e.g., by molding, 3D-printing). Each vent hole may intersect (i.e., overlap with) the longitudinal axis 101.

In this embodiment, the device 100 comprises a central vent hole 126 and a plurality of side vent holes 128. The central vent hole 126 may be approximately elliptical in shape with its major axis approximately aligned with the longitudinal axis 101. The central vent hole 126 is approximately equidistant between the first short side 108 and the second short side 110 of the sheet 102.

Each of the side vent holes 128 may be approximately elliptical in shape with its major axis perpendicular to the longitudinal axis 101. The side vent holes 128 may be arranged in a first set 130 on one side of the central vent hole 126 (i.e., between the first short side 108 and the central vent hole 126) and a second set 132 on the other side of the central vent hole 126 (i.e., between the central vent hole 126 and the second short side 110). In this embodiment, the first set 130 comprises three full side vent holes 128 (i.e., full ellipses) and one half vent hole 128 (i.e., half of an ellipse) at the first short side 108 of the sheet 102. Similarly, the second set 132 comprises three full side vent holes 128 and one partial (half) side vent hole 128 at the second short side 110 of the sheet 102.

The combination of the central vent hole 126 and the side vent holes 128 may provide ventilation by allowing air from within the working structure to pass therethrough. The vent holes 126 and 128 may also reduce the amount of material of the sheet 102 along the longitudinal axis 101, thereby facilitating the bending of the sheet 102 at the longitudinal axis 101. In some embodiments, the vent holes 126 and 128 may be dimensioned such that their combined length reduces the amount of material along the longitudinal axis 101 by at least about 80%, at least about 90%, or at least about 95%. In other embodiments, the vent holes 126 and 128 may each be any suitable length.

Other variations are also possible. In other embodiments, the sheet 102 may comprise any other suitable number, shape, and size of vent holes and embodiments are not limited to the specific number, shape, and size of vent holes 126 and 128 shown in FIGS. 1-4. For example, the sheet 102 may alternatively comprise circular, square, or rectangular vent holes of any suitable size and may include more or fewer vent holes as appropriate.

Still referring to FIG. 1, the device 100 further comprises a plurality of slots 136 configured for attaching the device 100 to the working structure. Each slot 136 may function as a possible attachment point for a respective fastener and may be dimensioned to receive a respective fastener therethrough. The fasteners may comprise, for example, screws, bolts and nuts, rivets, pins, and/or any other suitable fastener.

The slots 136 may be arranged in one or more rows. In some embodiments, the slots 136 may be arranged in two or more rows. An arrangement of multiple rows of slots 136 will hereafter be referred to as an "array" of slots 136 and the device 100 may comprise at least one array. In the embodiment of FIG. 1, the device 100 comprises four arrays of slots 136: a first array 138, second array 140, third array 142, and fourth array 144. The first and second arrays 138 and 140 are proximate the first long side 112, with the first array 138 being closer to the first short side 108 and the second array 140 being closer to the second short side 110. The third and fourth arrays 142 and 144 are proximate the second long side 114, with the third array 142 being closer to the first short side 108 and the fourth array 144 being closer to the second short side 110. Note that the arrays are only labeled in FIG. 1, and not FIGS. 2-4, for simplicity.

Figure 5:
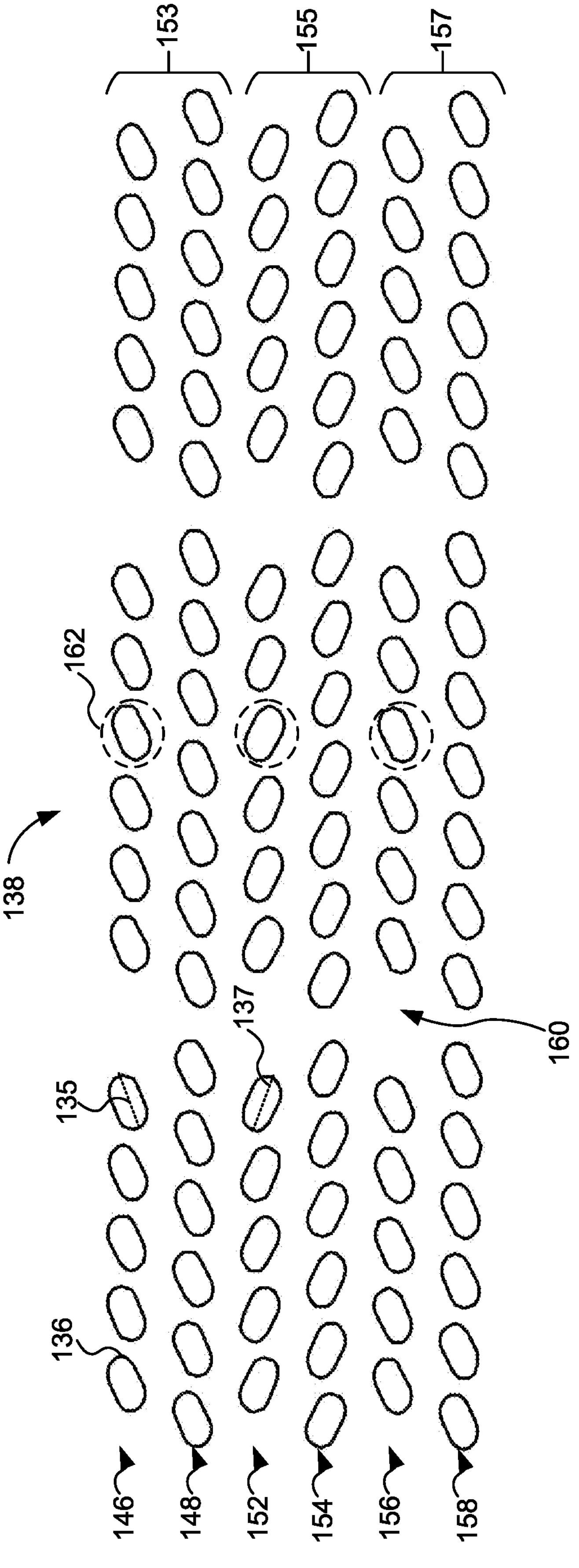
FIG. 5 is an enlarged view of an array of slots of the anchor device of FIG. 1.

FIG. 5 is an enlarged view of the first array 138 of slots 136. The first array 138 has six rows of slots 136: a first row 146, second row 148, third row 152, fourth row 154, fifth row 156, and sixth row 158. In other embodiments, the first array 138 may have any other suitable number of rows. In this embodiment, the even rows (i.e., the second, fourth, and sixth rows 148, 154, and 158) have an approximately continuous line of slots 136, while the odd rows (i.e., the first, third, and fifth rows 146, 152, 156) have one or more gaps 160 in which a slot 136 is omitted. The gaps 160 may be used to include labels for the rows, such as letters or numbers. In other embodiments, the odd rows may be continuous, while the even rows have gaps. In other embodiments, the gaps 160 may be omitted and both the odd rows and even rows may be continuous.

In this embodiment, the even rows (i.e., the second, fourth, and sixth rows 148, 154, and 158) each have a total of nineteen slots 136, while the odd rows (i.e., the first, third, and fifth rows 146, 152, 156) have sixteen slots 136. In other embodiments, each row 146-158 may have any other suitable number of slots 136. For example, the number of slots 136 may be selected based on the desired length of the row.

Each row 146-158 is spaced laterally from its adjacent row(s) and the slots 136 of a given row 146-158 are parallel to the slots 136 of an adjacent row(s) along the longitudinal axis 101. Within a given row 146-158, each slot 136 is longitudinally offset from a respective adjacent slot 136 of an adjacent row 146-158. In other words, the slots 136 are staggered and do not form parallel columns. This staggered, overlapping configuration of slots 136 thereby provides continuously available attachment points for fasteners.

The slots 136 extend through the sheet 102 from the upper face 104 to the lower face 106. In this embodiment, each slot 136 has an elongated, non-circular profile. The profile of each slot may be oblong (as shown in FIG. 5), oval, elliptical, or any other suitable shape. The elongated shapes of the slots 136 may allow the slots 136 to receive fasteners of a variety of locations, shapes and sizes therethrough to secure the device 100 to the working structure. In other embodiments, the slots 136 may have a round, approximately circular shape or any other suitable shape.

Each slot 136 in this embodiment is angled with respect to the longitudinal axis 101. In other words, each slot 136 has a central axis 135 or 137 that is at an angle relative to the longitudinal axis 101. The slots 136 of each row 146-158 may be at the same angle as other slots 136 within the same row 146-158. In some embodiments, at least one row 146-158 has slots 136 at a different angle than an adjacent row 146-158.

Figure 6B:
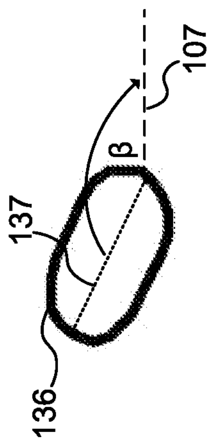
FIGS. 6A and 6B are enlarged views of selected slots from the array of FIG. 5.
Figure 6A:
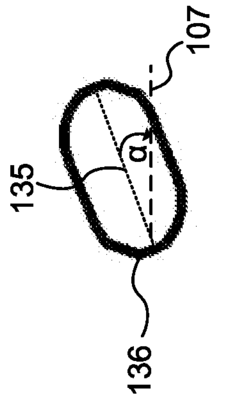

FIG. 6A is an enlarged view of one of the slots 136 of the first row 146, shown with a dashed line 107 parallel to the longitudinal axis 101. The central axis 135 of the slot 136 is at angle $\alpha$ with respect to the longitudinal axis 101. In some embodiments, angle $\alpha$ is between about 20 and about 45 degrees. This range of angles allows each slot 136 to provide effective coverage of the longitudinal and lateral area while still maintaining a relatively small width/diameter such that a fastener is securely received into the slot 136. In other embodiments, angle $\alpha$ is any other suitable angle.

FIG. 6B is an enlarged view of one of the slots 136 of the third row 152, shown with a dashed line 107 parallel to the longitudinal axis 101. The central axis 137 of the slot 136 is at an angle $\beta$ from the longitudinal axis 101, the angle $\beta$ being different than the angle $\alpha$. In some embodiments, angle $\beta$ is supplementary of angle $\alpha$. For example, where angle $\alpha$ is between about 20 and about 45 degrees, angle $\beta$ may be between about 135 and 160 degrees. In other embodiments, angle $\beta$ is any other suitable angle.

Referring again to FIG. 5, the rows 146-158 in this embodiment are arranged in pairs: rows 146/148 are a first pair 153, rows 152/154 are a second pair 155, and rows 156/158 are a third pair 157. Each pair has slots 136 at the same angle and the angle of the slots 136 alternates between adjacent pairs. In this embodiment, the slots 136 in the first pair 153 are at angle $\alpha$, the slots 136 of the second pair 155 are at angle $\beta$, and the slots 136 in the third pair 157 are at angle $\alpha$ again. In other embodiments, additional pairs can be added and the pattern of alternating angles of the slots 136 can continue.

Fasteners may be installed through at least one slot 136 of each pair. The dashed circles 162 in FIG. 5 represent fasteners and FIG. 5 provides one example of how the fasteners could be positioned. In this example, a respective fastener is installed in each of the odd rows (i.e., the first, third, and fifth rows 146, 152, 156). In other embodiments, a respective fastener could be installed in each of the even rows (i.e., the second, fourth, and sixth rows 148, 154, and 158). Thus, the fasteners can be installed in every other row in slots 136 of alternating angles. This arrangement may help to prevent migration of fasteners, which can occur in conventional devices in which the attachment holes are all in the same orientation. Although one example of the positioning of the fasteners is shown in FIG. 5, it will be understood that many other arrangements are possible and embodiments are not limited to one specific arrangement.

The second, third, and fourth arrays 140, 142, and 144 of slots 136 each have a similar structure as the first array 138. In this embodiment, the sheet 102 is symmetrical about the longitudinal axis 101 such that the third and fourth arrays 142 and 144 are mirror images of the first and second arrays 138 and 140. The sheet 102 is also laterally symmetrical such that the second array 140 is a mirror image of the first array 138 and the fourth array 144 is a mirror image of the third array 142.

In other embodiments, one or more of the arrays 138, 140, 142, 144 may have a different size, shape, number, angle, and arrangement of slots 136 than the other arrays. For example, some arrays could have more or fewer rows and/or could have a different pattern of alternating slot 136 angles. It will be understood that multiple variations are possible and embodiments are not limited to the specific size, shape, angle, number, and arrangement of slots 136 shown in FIGS. 1-6B.

In use, a user may attach the anchor device 100 to a working structure such as a roof by installing fasteners through slots 136 of the four slot arrays 138, 140, 142, 144. For example, fasteners may be installed in each of the arrays 138, 140, 142, and 144 in a similar arrangement to that of FIG. 5, as discussed above. In other embodiments, the fasteners may be in any suitable arrangement.

In embodiments in which the working structure is the peak of the roof, the sheet 102 may be bent along the longitudinal axis 101 such that the first long side 112 (and first and second arrays 138, 140) are on one side of the peak and the second long side 114 (and third and fourth arrays 142, 144) are on the other side. The user may then connect a safety line to one of the loops 118 of the anchorage connectors 116 that is bent upwards to provide access to the hole 120. Once the safety line is connected, the user is thereby secured to the working structure in the event of a fall. The vent holes 126, 128 allow for ventilation of air from the working structure. In some embodiments, a series of devices 100 can be installed along the working structure to allow the user to anchor themselves at various locations as needed.

The configuration and arrangement of the slots arrays 138, 140, 142, 144 may allow the anchor device 100 to be positioned so that the anchor device 100 is more securely attached than conventional fall protection systems, thereby reducing the risk of the device 100 detaching from the working structure and/or damaging the working structure. The device 100 may also be made from a single sheet 102 of material, thereby simplifying manufacturing and eliminating potential weak points of multi-component devices.

An alternative anchor device 200 will be discussed with reference to FIG. 7.

The device 200 comprises a sheet 202 having an upper face 204 and a lower face (not shown). The sheet 202 is approximately rectangular and has first and second short sides 208 and 210 and first and second long sides 212 and 214. In other embodiments, the sheet 202 may be any other suitable shape. The sheet 202 may be made of any of the materials discussed above for the sheet 102 of the device 100 and may have a similar thickness.

The sheet 202 has a longitudinal axis 201 and a lateral axis 203. In this embodiment, the sheet 202 is shorter in length (i.e., in the direction of the longitudinal axis 201) than the sheet 102 of FIGS. 1-6B. In other embodiments, the sheet 202 is any other suitable length.

The device 200 further comprises an anchorage connector 216. In this embodiment, the anchorage connector 216 is on the second long side 214; however, in other embodiments, the anchorage connector 216 can be on the first long side 212. The anchorage connector 216 extends laterally outwards from the sheet 202 and comprises a loop portion 218 and a hole 220. The loop portion 218 can be bent upwards in similar manner to the anchorage connector 116 of the device 100.

In this embodiment, the anchorage connector 216 is integral with the sheet 202, such that the entire device 200 is formed out of a single piece of material. In other embodiments, the anchorage connector 216 may be a separate component that is coupled to the sheet 202 by any suitable coupling means.

In this embodiment, the anchorage connector 216 is at the approximate longitudinal center of the sheet 202 i.e., approximately midway between the first short side 208 and the second short side 210 (and along the lateral axis 203). In other embodiments, the anchorage connector 216 may be at any other suitable position.

The device 200 further comprises a plurality of slots 236 in the sheet 202 for attaching the device 200 to the working structure. The slots 236 are similar in structure to the slots 136 of the device 100. The slots 236 are arranged in two arrays: a first array 238 and a second array 240. The arrays 238, 240 are similar to the arrays 138, 140, 142, 144 of the device 100, but with fewer slots 236 per row. In this embodiment, each array 238, 240 comprises alternating rows of eleven and thirteen slots 236. In other embodiments, each row may comprise any other suitable number of slots 236.

The device 200 may therefore be seen as a more compact, "one-sided" version of the device 100. The device 200 may be used for working structures that do not have a peak and/or for working structures where attachment to only one part of the structure is desired. The device 200 may also be useful for working structures in which there is only a limited area that is suitable for attachment.

Another alternative anchor device 300 will be discussed with reference to FIGS. 8 to 9B.

Figure 8:
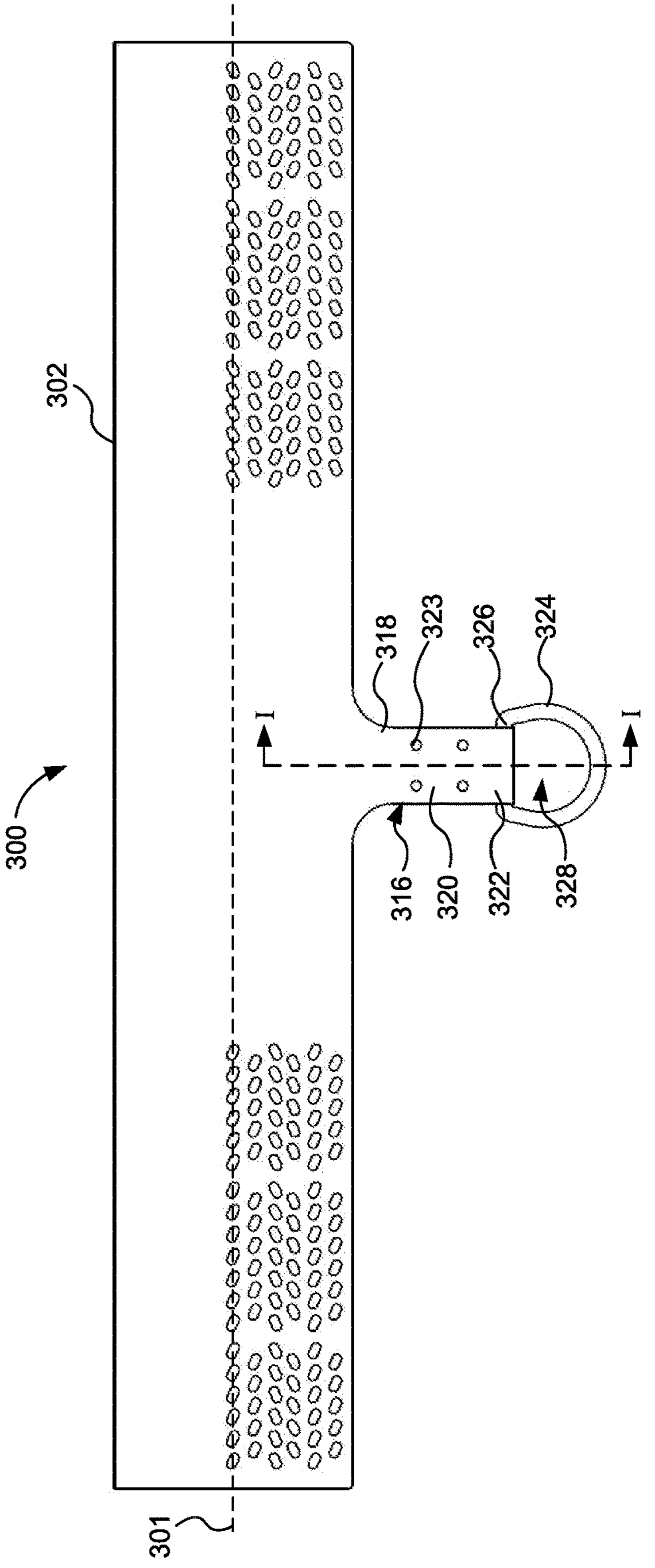
FIG. 8 is a top view of another alternative anchor device, according to some embodiments.

Referring to FIG. 8, the device 300 in this embodiment comprises a sheet 302 with an anchorage connector 316.

Figure 9A:
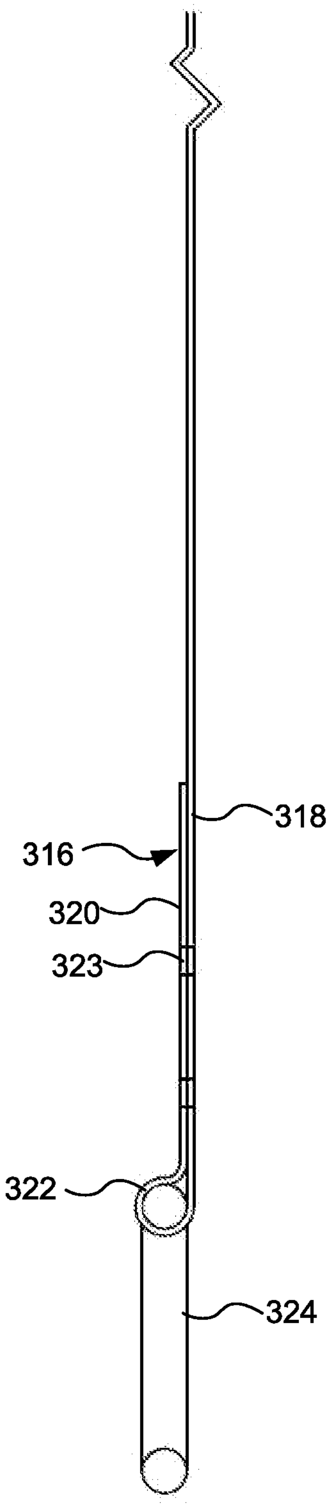
FIGS. 9A and 9B are side, cross-sectional views of the anchorage connector of the anchor device of FIG. 8, taken along line I-I, shown with and without the connector ring, respectively.
Figure 9B:
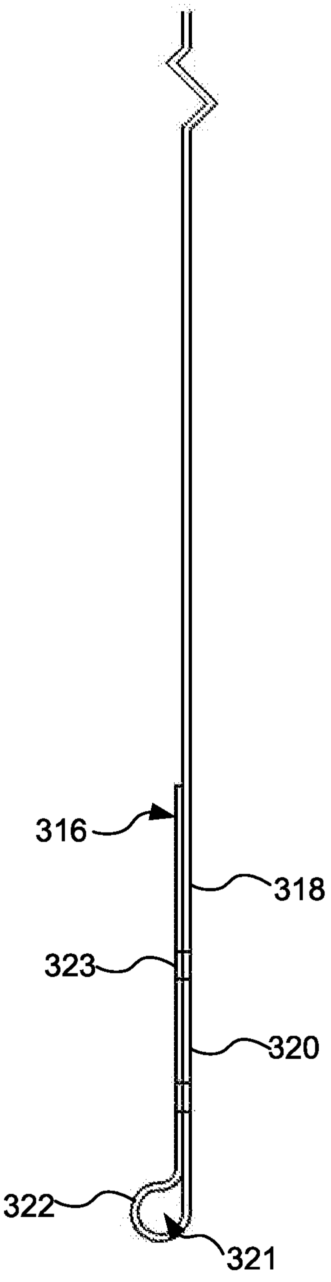

The anchorage connector 316 will be discussed in more detail with reference to FIGS. 9A-9B. The anchorage connector 316 in this embodiment comprises a lateral extension 318 of the sheet 302 and a connector ring 324.

The lateral extension 318 comprises a flat, tab portion 320 and a tubular portion 322. The tubular portion 322 defines a bore 321 therethrough (the bore 321 is visible in FIG. 9B) to engage the connector ring 324. The bore 321 may be approximately parallel to the longitudinal axis 301 (shown in FIG. 8).

The lateral extension 318 extends laterally outwards from the sheet 302, with the tubular portion 322 at its distal end. In this embodiment, the lateral extension 318 is integral with the sheet 302. The tubular portion 322 may be formed by folding the tab portion 320 back on itself and coupling the overlapped section together at coupling points 323. The coupling points 323 may comprise spot welds or fasteners (e.g., rivets or bolts) received through respective holes. In other embodiments, the coupling points 323 comprise any other suitable coupling means.

In other embodiments, the lateral extension 318 can be a separate component that is coupled to the sheet 302 by a suitable coupling means. The tab portion 320 and the tubular portion 322 may be integral with one another or may also be separate components coupled together.

Referring to FIG. 8, the connector ring 324 in this embodiment is a D-ring with a linear portion 326 and a central opening 328 therethrough. The linear portion 326 of the connector ring 324 is received into the tubular portion 322 of the lateral extension 318. The central opening 328 is a suitable shape and size to receive a hook, clip, clasp, etc. of a safety line or any other suitable apparatus to connect the user to the device 300.

Figure 7:
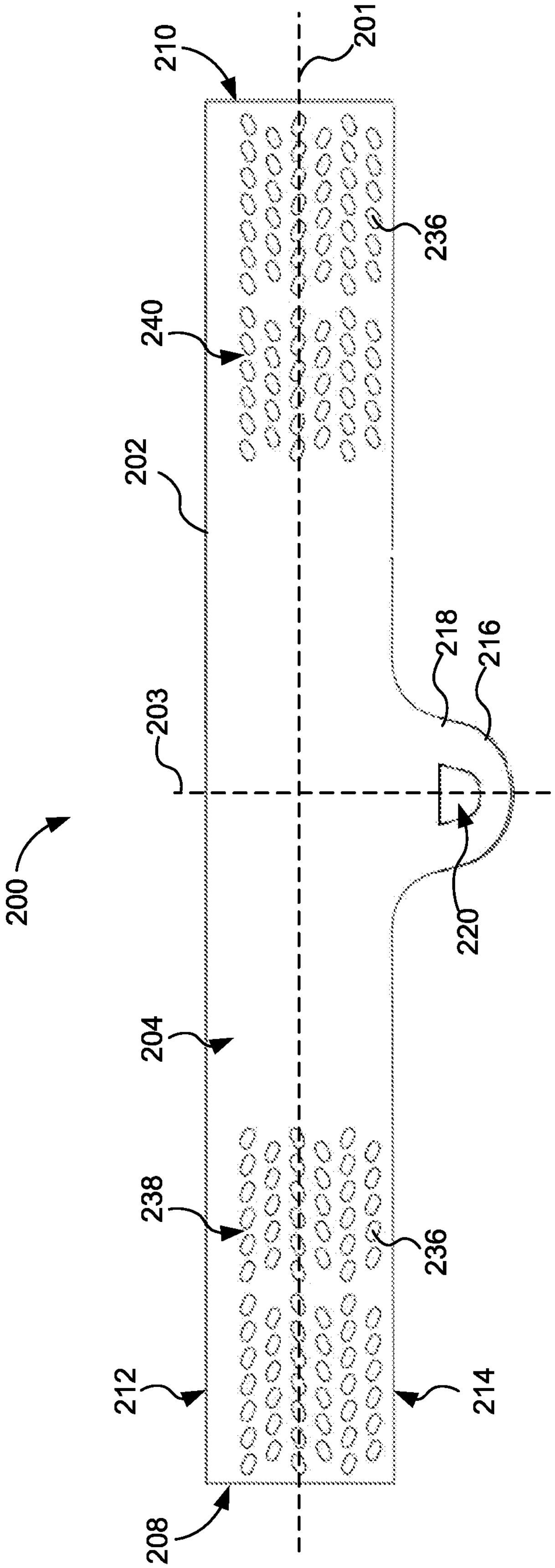
FIG. 7 is a top view of an alternative anchor device, according to some embodiments.

The device 300 in this embodiment is therefore a compact, "one-sided" device similar to the device 200 of FIG. 7 but with an alternative anchorage connector structure. Alternatively, the device 300 can be a "two-sided" device similar to the "two-sided" device 100 of FIGS. 1-6B and the anchorage connector 316 may replace one or both of the anchorage connectors 116.

Figure 10B:
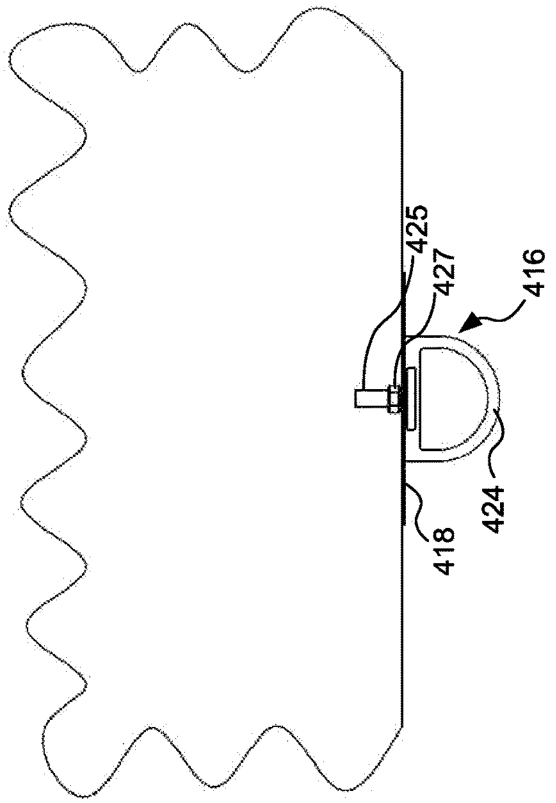
FIG. 10B is a partial, front view taken from arrow A in FIG. 10A.
Figure 10C:
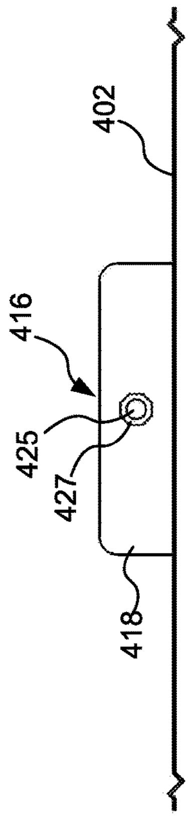
FIG. 10C is an enlarged, top-down view taken from arrow B in FIG. 10A.

Another alternative anchor device 400 will be discussed with reference to FIGS. 10A-10C.

Figure 10A:
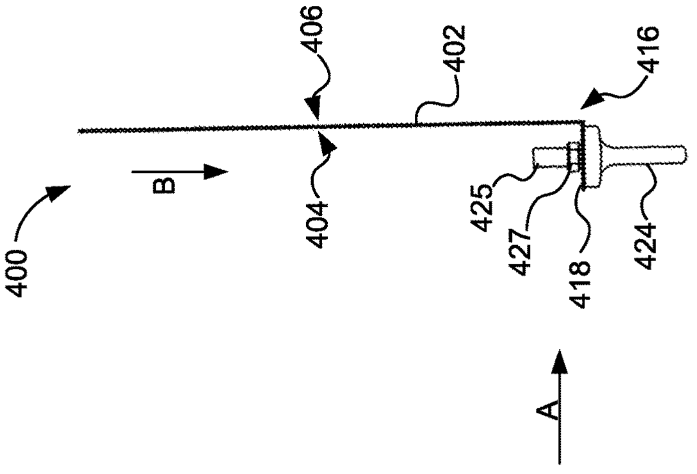
FIG. 10A is a side view of another alternative anchor device, according to some embodiments.

Referring to FIG. 10A, the device 400 comprises a sheet 402 and an anchorage connector 416. The sheet 402 is similar in structure to the sheet 202 of the device 200 and has an upper face 404 and a lower face 406. In this embodiment, the anchorage connector 416 comprises a bent extension 418 of the sheet 402, a connector ring 424, and a bolt 425.

The bent extension 418 extends laterally outwards from the sheet 402 and is bent upwards (i.e. towards the upper face 404) such that it is substantially perpendicular (i.e. approximately 90 degrees) with respect to the sheet 402. In this embodiment, the extension 418 is approximately rectangular in shape (as can be seen in FIG. 10C). In other embodiments, the extension 418 may be similar in structure to the loop 218 of the device 200 and may be bent upwards in a similar manner. In other embodiments, the extension 418 may be any other suitable structure. The extension 418 comprises a hole therethrough (not shown) sized to receive the bolt 425. In this embodiment, the extension 418 is integral with the sheet 402. In other embodiments, the extension 418 can be a separate component that is coupled to the sheet 402 by a suitable coupling means.

The connector ring 424 in this embodiment is a D-ring and has a similar structure to the connector ring 324 of the device 300. The connector ring 424 may be coupled to the bolt 425 by welding or any other suitable means. Alternatively, the connector ring 424 and the bolt 425 may be integral with one another.

The bolt 425 is received through the hole of the bent extension 418 to interconnect the connector ring 424 with the bent extension 418 (and therefore with the sheet 402). A nut 427 is then tightened around the bolt 425 to secure the connector ring 424 and the extension 418 together. The device 400 may then be attached to a working structure and the connector ring 424 can receive a hook, clip, clasp, etc. of a safety line or any other suitable apparatus to connect the user to the device 400.

Thus, the device 400 is a one-sided device similar to the devices 200 and 300 but with an alternative anchorage connector. Alternatively, the device 400 can be a two-sided device similar to the "two-sided" device 100 and the anchorage connector 416 may replace one or both of the anchorage connectors 116.

Another alternative anchor device 500 will be discussed with reference to FIGS. 11 and 12.

Figure 11:
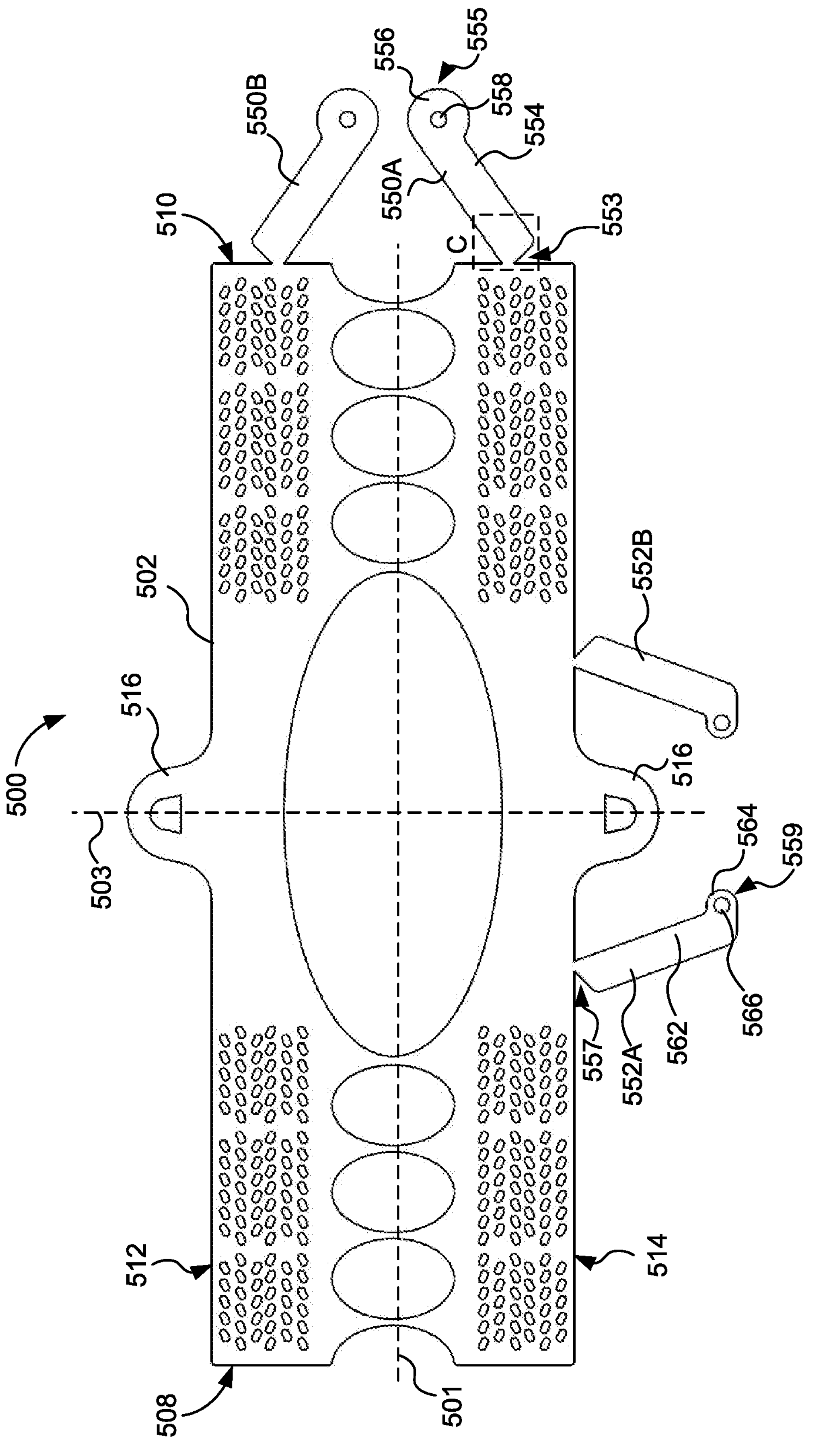
FIG. 11 is a top view of another alternative anchor device, according to some embodiments.

Referring to FIG. 11, the device 500 comprises a sheet 502 with at least one detachable testing projection extending therefrom. The sheet 502 has a longitudinal axis 501 and a lateral axis 503. The sheet 502 has first and second short sides 508, 510 and first and second long sides 512, 514. The sheet 502 in this embodiment is similar to the sheet 102 of the device 100 and includes anchorage connectors 516. However, it will be understood that the testing projection(s) may also be used with the device 200, 300, or 400 and embodiments are not limited to only the device 100.

In this example, the device 500 comprises two pairs of testing projections. A first pair of projections 550A, 550B are disposed on (i.e. project from) the second short side 510 of the sheet 502 and a second pair of projections 552A, 552B are disposed on (i.e. project from) the second long side 514 of the sheet 502. Alternatively, the projections 550A, 550B may be disposed on the first short side 508 or on both short sides 508, 510. Similarly, the projections 552A, 552B may be disposed on the first long side 512 or on both long sides 512, 514. In some embodiments, a pair of projections 550A, 550B may be disposed on each of the short sides 508, 510 and a pair of projections 552A, 552B may be disposed on each of the long sides 512, 514. Hereafter, the projections 550A, 550B may be referred to as "short-side projections" and the projections 552A, 552B may be referred to as "long-side projections".

Each projection 550A, 550B, 552A, 552B is a relatively thin, and flat piece of material having the same or a similar thickness as the sheet 502. The projections 550A, 550B, 552A, 552B may be integral with the sheet 502 or may be attached to the sheet 502 after it is formed, for example, by welding or any other suitable coupling means.

The short-side projections 550A, 550B are spaced apart from one another on the second short side 510, with the first short-side projection 550A on one side of the longitudinal axis 501 and the second short-side projection 550B on the other side. In other embodiments, the short-side projections 550A, 550B may be at any other suitable position. In this embodiment, the short-side projections 550A, 550B are approximately mirror images of one another about the longitudinal axis 501.

Using the first short-side projection 550A as an example, the projection 550A has a proximal end 553 and a distal end 555 and comprises a straight portion 554 and a ring portion 556. The straight portion 554 is connected to the sheet 502 at the proximal end 553 and extends outward therefrom. In this embodiment, the straight portion 554 is approximately rectangular in shape and is at a diagonal with respect to the sheet 502 such that it is angled towards the longitudinal axis 501. As the second short-side projection 550B is the mirror image of the first short-side projection 550A, the two short-side projections 550A, 550B are angled inwards towards one another, while still maintaining a space between therebetween.

Figure 12:
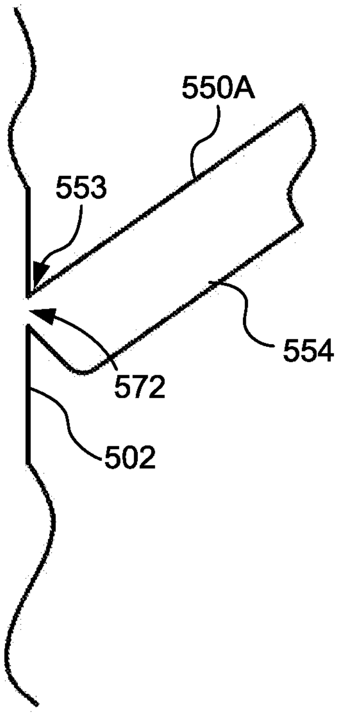
FIG. 12 is an enlarged view of a portion of the anchor device in box C in FIG. 11.

FIG. 12 shows an enlarged view of the connection between the straight portion 554 of the projection 550A and the sheet 502. At the proximal end 553 of the projection 550A, a small connection point 572 is provided that connects to the sheet 502. In this embodiment, the connection point 572 is the corner of the rectangular-shaped straight portion 554. The connection point 572 has width that is smaller than the width of the rest of the straight portion 554, for example, less than ½ of the width of the straight portion 554, or less than ⅓, etc. The width of the connection point 572 may be selected such that the projection 550A fails (i.e. detaches) at a pre-determined load and to facilitate easier removal.

Referring back to FIG. 11, the ring portion 556 extends outwards from the straight portion 554. Due to the angled straight portions 554, the respective ring portions 556 of the two projections 550A, 550B are close together (but still separated by a space therebetween). The ring portion 556 has a hole 558 therethrough. In this embodiment, the ring portion 556 is a rounded, approximately semi-circular shape. In other embodiments, the ring portion 556 may be approximately square-shaped or any other suitable shape. In other embodiments, the ring portion 556 may be omitted and a hole may be provided in the distal end of the straight portion 554.

The long-side projections 552A, 552B are spaced apart from one another on the second long side 514 of the sheet 502, with the first long-side projection 552A on one side of lateral axis 503 (and the anchorage connector 516) and the second long-side projection 552B on the other side. In other embodiments, the long-side projections 552A, 552B may be at any other suitable position. In this embodiment, the long-side projections 552A, 552B are approximately mirror images of one another about the lateral axis 503.

The long-side projections 552A, 552B are similar in structure to the short-side projections 550A, 550B. The long-side projections 552A, 552B may be the same size as the short-side projections 550A, 550B or may be larger or smaller. Using the first long-side projection 552A as an example, the projection 552A has a proximal end 557 and a distal end 559 and comprises a straight portion 562 and a ring portion 564. The straight portion 554 is connected to the sheet 502 at a small connection point at the proximal end 557 in a similar manner to the projection 550A as discussed above. The straight portion 562 extends outwards from the sheet 502 at a diagonal and is angled towards the lateral axis 503. As the second long-side projection 552B is the mirror image of the first long-side projection 552A, the two long-side projections 552A, 552B are angled towards one another, while still maintaining a space therebetween.

The ring portion 564 extends outwards from the straight portion 562 and has a similar structure to the ring portion 556 discussed above. The ring portion 564 comprises a hole 566 therethrough proximate the distal end 339 of the projection 552A.

The projections 550A/B and 552A/B may also be used for testing of the device 500 when it is first installed on a working structure, before being used for fall protection. For example, a pre-determined load may be applied to one or both pairs of projections 550A/B and 552A/B via the holes 558 and 566, respectively. Due to the small connection points between the projections 550A/B and 552A/B and the sheet 502, the projections 550A/B and 552A/B may detach if the applied load is above a predetermined threshold. If the sheet 502 detaches from the working structure before the projections 550A/B and 552A/B fail, then the test indicates that the sheet 502 is not adequately fastened to the working structure.

Once the device 500 is ready for its final use, the projections 550A/B and 552A/B may be detached from the sheet 502 (if not detached already during testing) and the sheet 502 may otherwise be used in the same manner as the sheet 102 of the device 100 as described above.

Another alternative anchor device 600 will be discussed with reference to FIG. 13.

The device 600 comprises a sheet 602 and detachable testing projections 650 and 652. The sheet 602 in this embodiment is similar to the sheet 102 of the device 100 and includes anchorage connectors 616. However, it will be understood that the projections 650 and 652 may also be used with the device 200, 300, or 400 and embodiments are not limited to only the device 100.

The sheet 602 has a longitudinal axis 601 and a lateral axis 603. The sheet 602 has first and second short sides 608, 610 and first and second long sides 612, 614. The projection 650 may be referred to as a "short-side projection" and may be disposed on (i.e. project from) either or both of the short sides 608, 610. The projection 652 may be referred to as a "long-side projection" and may be disposed on (i.e. project from) either or both of the long sides 612, 614. In some embodiments, a projection 650 may be disposed on each of the short sides 608, 610 and a projection 652 may be disposed on each of the long sides 612, 614. In this example, the short-side projection 650 is on the second short side 610 and the long-side projection 652 is on the second long side 614.

The short-side projection 650 is a V-shaped projection and extends longitudinally outwards from the sheet 602. The short-side projection 650 has two straight side portions 654 and 656, each with a respective proximal end 653, 655 connected to the sheet 602 via small detachable connection points similar to the connection point 572 shown in FIG. 12. The side portions 654 and 656 extend outwards from their respective proximal ends 653, 655 and are joined together at a middle section 660. In other words, the projection 650 is a loop connected to the sheet 602 via two connection points. The projection 650 thereby forms an approximately triangular opening 664 with the side 610 of the sheet 602.

The long-side projection 652 is similar in structure to the short-side projection 650. The projection 652 is also approximately V-shaped and extends laterally outwards from the sheet 602. The long-side projection 652 has two straight side portions 666 and 668, each with a respective proximal end 665 and 667 connected to the sheet 502 via small detachable connection points similar to the connection point 572 shown in FIG. 13. The side portions 666 and 668 extend outwards from their respective proximal ends 665, 667 and are joined together at a middle section 670. The projection 652 thereby forms an approximately triangular opening 674 with the side 614 of the sheet 602.

The projections 650 and 652 may function in a similar manner as the projections 550 and 552 of the device 500 as described above. The triangular openings 664 and 674 can be used to apply a predetermined load to test the device 600 before use. The projections 650 and 652 can then be removed from the sheet 602 by detaching their respective proximal ends.

Figure 13:
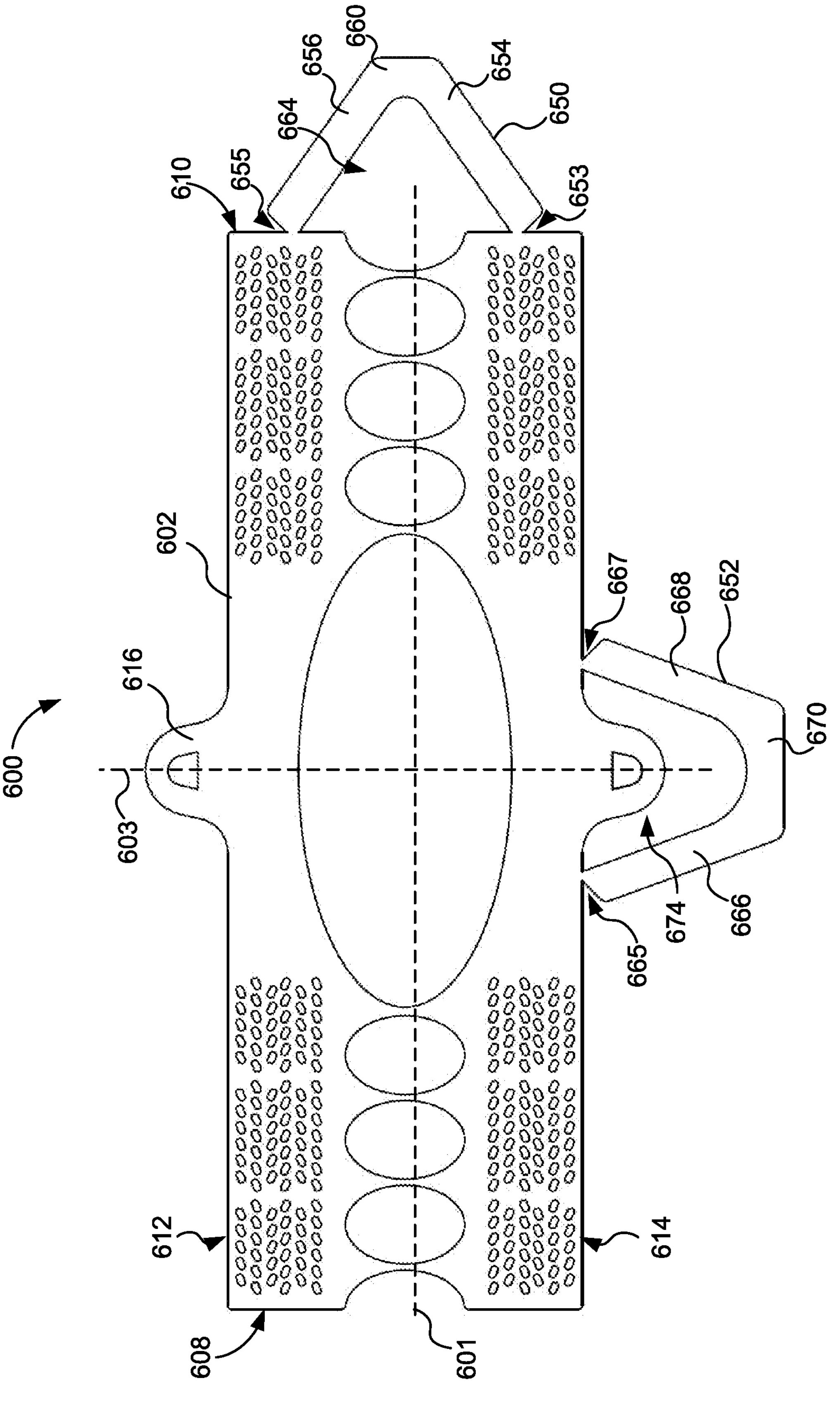
FIG. 13 is a top view of another alternative anchor device, according to some embodiments.

Although the projections 650 and 652 in FIG. 13 are depicted as approximately V-shaped in this embodiment, in other embodiments the projections may be approximately U-shaped with the side portions being at less of an angle and the middle portion being wider. In addition, although the projections 650 and 652 in this embodiment each have two connection points with the sheet 602, embodiments are also contemplated with more than two connection points, such as three, four, etc. connection points as desired.

Therefore, the present disclosure provides both one-sided and two-sided anchor devices, each of which can have three possible anchor connector structures: 1) the loop structure of the devices 100 and 200; and/or 2) the lateral extension and connector ring of the device 300; and/or 3) the bolted connector ring of the device 400. It will also be understood that embodiments are not limited to only the three anchor connectors described herein and other structures are also possible. Each anchor device also has the option to include the testing projections of the device 500 or 600 (or a combination of the two).

Figure 14:
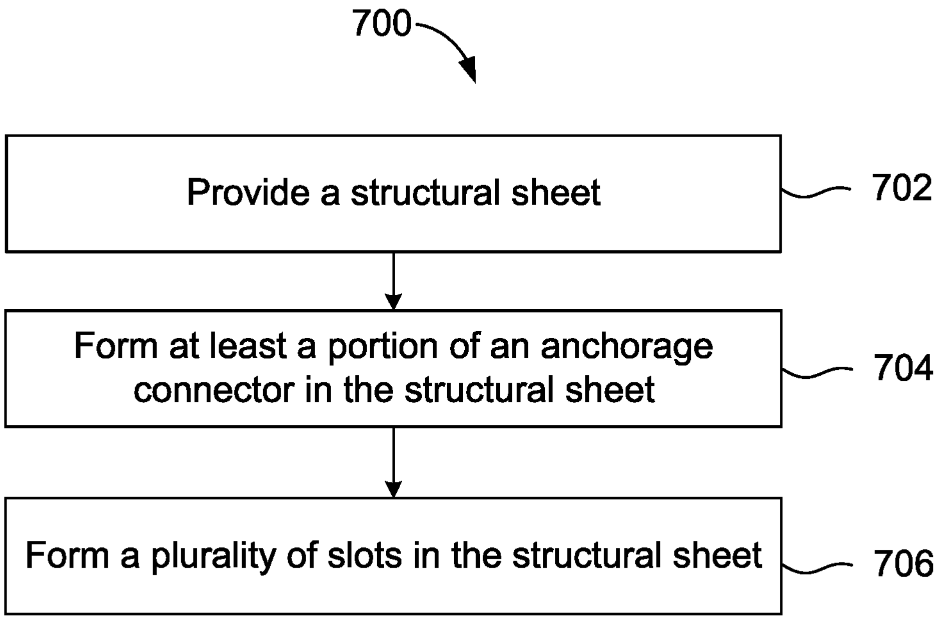
FIG. 14 is a flowchart of a method for making an anchor device, according to some embodiments.

FIG. 14 is a flowchart of an example method 700 for making an anchor device, according to some embodiments.

At block 702, a structural sheet is provided. The term "provide" in this context refers to making, acquiring, purchasing, or otherwise obtaining the structural sheet. The structural sheet may be made of any of the materials discussed above. The structural sheet has a longitudinal axis and a lateral axis.

At block 704, at least a portion of an anchorage connector is formed in the structural sheet. In some embodiments, the entire anchorage connector is formed in the structural sheet. For example, a loop with a hole therethrough such as the anchorage connector 116 may be formed in the sheet. In other embodiments, only a portion of the anchorage connector may be formed in the sheet, for example, the lateral extensions 318 and 418 of the anchorage connectors 316 and 416, respectively. In these latter embodiments, a connector ring may be provided separately and attached to the lateral extension in the manner described above.

In some embodiments, the anchorage connector (or portion thereof) is formed by initially providing a larger sheet at block 702 and cutting the sheet down to leave the desired anchorage connector structure. In other embodiments, the sheet may be formed with the anchorage connector (or portion thereof) therein e.g. via molding, 3D-printing, etc. In the latter embodiments, the steps at block 704 may be simultaneous with the steps at block 702.

In some embodiments, only one anchorage connector (or portion thereof) is formed on one side of the sheet. In other embodiments, two anchorage connectors (or portions thereof) are formed, one on either side of the sheet.

At block 706, a plurality of slots is formed in the sheet, each of the plurality of slots dimensioned to receive a respective fastener therethrough. In some embodiments, the slots have an elongated profile that is angled with respect to the longitudinal axis of the sheet. In other embodiments, the slots may have a rounded profile. The slots may be arranged in any of the manners described above with respect to the slots of any of the devices 100, 200, 300, and 400.

The slots may be formed by cutting out, punching out, or otherwise removing material from the sheet. Alternatively, the sheet may be formed with the slots already formed therein e.g. by molding, 3D-printing, etc. In the latter embodiments, the steps at block 706 may be simultaneous with the steps at block 702.

In some embodiments, the method 700 may further comprise forming at least one vent hole in the structural sheet. The vent hole(s) may intersect the longitudinal axis of the sheet and may have any of the features discussed above with respect to the vent holes of the device 100. The vent hole(s) may be formed by cutting out, punching out, or otherwise removing material from the sheet. In these embodiments, the vent hole(s) can be formed in the sheet before or after the slots are formed. Alternatively, the sheet may be formed with the vent hole(s) formed therein e.g. by molding, 3D-printing, etc. as part of the steps at block 702.

In some embodiments, the method 700 may further comprise providing at least one detachable testing projection extending from the sheet. The projection(s) may have any of the features and structure discussed above with respect to the projections 550/552 or 650/652 of the devices 500 and 600. In some embodiments, projections are provided on one of the long sides of the sheet and one of the short sides. In other embodiments, projections may be provided on any side or combination of sides of the sheet.

In some embodiments, the projection(s) are provided separately and attached to the sheet e.g. by welding. In other embodiments, the sheet may be formed with the projection(s) as an integral part thereof. The projections may be provided as part of block 702 or as an additional step thereafter.

In some embodiments, the method 700 may further comprise using the projections for testing the anchor device prior to use.

In some embodiments, the method 700 may further comprise bending the sheet along the longitudinal axis prior to use. In addition, in embodiments in which the anchor connector is a loop structure, the loop may be bent upwards prior to use.

Therefore, in some embodiments, the entire anchor device (or almost the entire anchor device) may be formed out of one sheet of material as opposed to conventional anchor devices that are typically made from multiple components coupled together.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An anchor device comprising:

a structural sheet comprising an upper face and a lower face, first and second short sides, and first and second long sides, and having a longitudinal axis and a lateral axis;

at least one anchorage connector extending outwards from at least one of the first and second long sides of the structural sheet perpendicular to the longitudinal axis and parallel to the lateral axis; and a plurality of slots extending through the structural sheet from the upper face to the lower face, each slot of the plurality of slots dimensioned to receive a respective fastener therethrough and having an elongated profile that is angled with respect to the longitudinal axis of the structural sheet;

wherein the plurality of slots are arranged in two or more rows, the slots of each row being longitudinally aligned with one another and diagonally offset and longitudinally overlapping with slots of an adjacent row, and wherein the slots of one row are at an acute angle with respect to the longitudinal axis and the slots of another row are at a supplementary angle to the acute angle.

2. The anchor device of claim 1, wherein the two or more rows are arranged into a first pair of rows and a second pair of rows, and wherein the slots of the first pair of rows are at the acute angle and the slots of the second pair of rows are at the supplementary angle.

3. The anchor device of claim 2, wherein the two or more rows are further arranged into a third pair of rows, and wherein the slots of the third pair of rows are at the acute angle.

4. The anchor device of claim 1, further comprising at least one vent hole extending through the structural sheet from the upper face to the lower face, the at least one vent hole intersecting the longitudinal axis.

5. The anchor device of claim 4, wherein the at least one vent hole comprises a central vent hole and a plurality of side vent holes on either side of the central vent hole.

6. The anchor device of claim 1, wherein the at least one anchorage connector is integral with the structural sheet and comprises a loop with a hole extending therethrough.

7. The anchor device of claim 6, wherein the loop is bent upwards towards the upper face of the structural sheet.

8. The anchor device of claim 1, wherein the at least one anchorage connector comprises:

a connector ring; and a lateral extension of the structural sheet, the lateral extension having a tubular portion that receives a portion of the connector ring therethrough.

9. The anchor device of claim 1, wherein the at least one anchorage connector comprises:

a connector ring;

a bent extension of the structural sheet, the bent extension being bent upwards towards the upper face of the structural sheet; and a bolt extending through the bent extension to interconnect the bent extension and the connector ring.

10. The anchor device of claim 1, wherein the structural sheet is a one-sided sheet such that the at least one anchorage connector is a single anchorage connector extending outwards from one side of the structural sheet.

11. The anchor device of claim 1, wherein the structural sheet is a two-sided sheet such that the at least one anchorage connector comprises a first anchorage connector extending outwards from one side of the structural sheet and a second anchorage connector extending outwards from the opposite side of the structural sheet.

12. The anchor device of claim 1, further comprising at least one testing projection extending outwards from the structural sheet, the at least one testing projection configured to detach from the structural sheet at a pre-determined load.

13. The anchor device of claim 12, wherein the at least one testing projection has a straight portion and a ring portion, the straight portion connected to the structural sheet via one or more detachable connection points and the ring portion extending from the straight portion and comprising a hole therethrough.

14. The anchor device of claim 12, wherein the at least one testing projection is V-shaped or U-shaped and has at least two detachable connection points with the structural sheet.

15. An anchor device comprising:

a structural sheet comprising an upper face and a lower face, first and second short sides, and first and second long sides, and having a longitudinal axis and a lateral axis;

at least one anchorage connector extending outwards from at least one of the first and second long sides of the structural sheet perpendicular to the longitudinal axis and parallel to the lateral axis;

a plurality of slots extending through the structural sheet from the upper face to the lower face, each slot of the plurality of slots having an elongated or round profile, wherein the plurality of slots are arranged in two or more rows, the slots of each row being longitudinally aligned with one another and diagonally offset and longitudinally overlapping with slots of an adjacent row, and wherein the slots of one row are at an acute angle with respect to the longitudinal axis and the slots of another row are at a supplementary angle to the acute angle; and at least one vent hole extending through the structural sheet from the upper face to the lower face, the at least one vent hole intersecting the longitudinal axis.

16. The anchor device of claim 15, wherein the at least one vent hole comprises a central vent hole and a plurality of side vent holes on either side of the central vent hole.

17. A method for making an anchor device, comprising:

providing a structural sheet having a longitudinal axis, a lateral axis, first and second short sides, and first and second long sides;

forming at least a portion of at least one anchorage connector in the structural sheet, wherein the at least one anchorage connector extends outwards from at least one of the first and second long sides of the structural sheet perpendicular to the longitudinal axis and parallel to the lateral axis; and forming a plurality of slots in the structural sheet, each slot of the plurality of slots dimensioned to receive a respective fastener therethrough and having an elongated profile that is angled with respect to the longitudinal axis of the structural sheet;

wherein the plurality of slots are arranged in two or more rows, the slots of each row being longitudinally aligned with one another and diagonally offset and longitudinally overlapping with slots of an adjacent row, and wherein the slots of one row are at an acute angle with respect to the longitudinal axis and the slots of another row are at a supplementary angle to the acute angle.

18. The anchor device of claim 4, wherein each vent hole of the at least one vent hole is a void that is oval or elliptical in shape.

* * * * *